United States Patent [19]

Spiteri

[11] 3,991,356
[45] Nov. 9, 1976

[54] BATTERY CHARGER

[76] Inventor: Joseph Spiteri, 6613 E. Lake Road, Erie, Pa. 16511

[22] Filed: Mar. 17, 1975

[21] Appl. No.: 559,331

[52] U.S. Cl. .................................. 320/2; 317/100; 320/DIG. 2; 336/192
[51] Int. Cl.² ........................ H02J 7/00; H01L 1/12
[58] Field of Search .................................. 320/2–5, 320/39, 40, 57–59, DIG. 2; 317/100; 336/92, 192

[56] References Cited
UNITED STATES PATENTS

| 2,979,607 | 4/1961  | Herzfeld | 320/4 X     |
| 3,296,515 | 1/1967  | Knauth   | 320/DIG. 2  |
| 3,365,645 | 1/1968  | Jacobs   | 320/DIG. 2  |
| 3,371,302 | 2/1968  | Mas      | 320/57 X    |
| 3,479,563 | 11/1969 | Roy      | 336/192 X   |
| 3,801,874 | 4/1974  | Stefani  | 317/100     |

Primary Examiner—Robert J. Hickey

[57] ABSTRACT

A battery charger circuit made up of a transformer and rectifier for providing a D.C. current having a positive and a negative terminal. A silicon control rectifier having a cathode, an anode, and a gate. The cathode of the silicon control rectifier is connected to the positive terminal of the rectifier circuit. The anode of the rectifier is connected to the positive terminal of the charger and the resistors are connected in a parallel with the cathode and gate of the silicon control rectifier.

The charger has a unique mechanical structure wherein a printed circuit board carries the electronic component and the printed circuit board is supported on the winding of the transformer. Both the transformer and the printed circuit board are enclosed in a chassis having a removable cover. The transformer has a flat top surface and the silicon control rectifier has a flat bracket which rests on the top surface of the transformer and the cover for the chassis rests on the bracket holding the bracket in heat transfer relation with the transformer cover.

The transformer is rated considerably higher than necessary, therefore the transformer never gets hot and the heat dissipated by the silicon control rectifier is dissipated through its back to the frame of the transformer which acts as a heat sink. The printed circuit board is supported on the transformer coil by four terminals which extend outwardly from the insulation of the coil.

4 Claims, 9 Drawing Figures

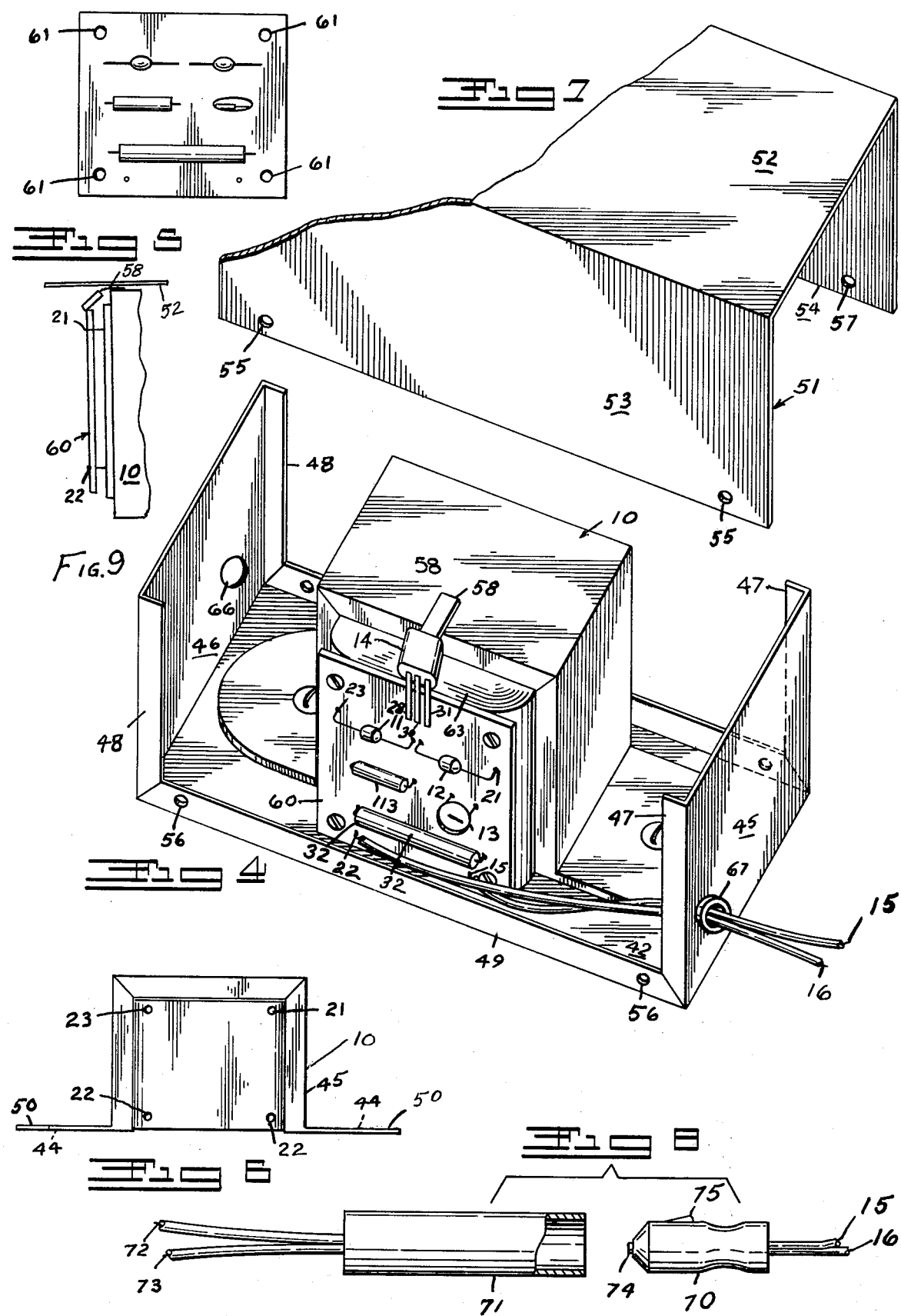

BATTERY CHARGER

GENERAL STATEMENT OF INVENTION

The electronic circuit for the battery charger is made up of a rectifier circuit and an SCR in series. The SCR completely shuts off the flow of current when the battery is fully charged. The SCR has a bracket that is supported in thermal conductive contact with the frame of the power transformer. A printed circuit board is supported on the ends of U-shaped wires supported to the covering of the transformer winding.

OBJECTS OF THE INVENTION

It is an object of the invention to provide an inexpensive, improved, automatic battery charger for automobiles, boats and the like. The principal feature of the invention consists of an automatic inexpensive circuit, an SCR and its gating component.

Another object of the invention is to provide an improved automatic battery charger including an SCR and a gating component which will control the rate of charging and shut off the charger when the battery is fully charged.

Another object of the invention is to provide an improved battery charger and heat sink combination.

Another object of the invention is to provide an improved electronic circuit and printed circuit board support for supporting the components of the circuit.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit of sacrificing any of the advantages of the invention.

GENERAL DESCRIPTION OF THE DRAWINGS

FIG. 4 is an isometric view of the battery charger according to the invention, with cover removed.

FIG. 5 is a front view of the printed circuit board.

FIG. 6 is an isometric view of the transformer separate from the printed circuit board.

FIG. 7 is an isometric view of the cover for the chassis.

FIG. 8 is an exploded view showing the adapter for connecting the output part of the charger to the battery to be charged.

FIG. 9 is a partial side view of the circuit board and support wires.

DETAILED DESCRIPTION OF THE DRAWINGS

Figure 1:
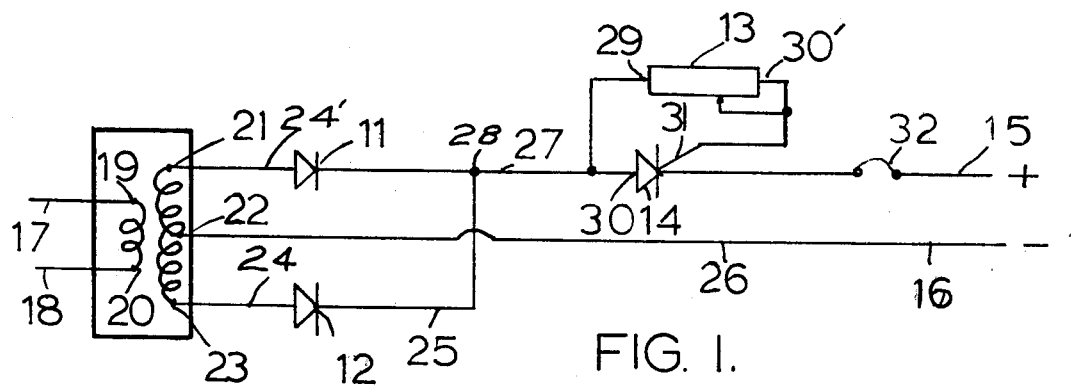
FIG. 1 is a schematic view of the charger according to the invention.

The charger according to the invention is made up of a rectifier circuit indicated generally at 10, which includes a transformer having terminals 19 and 20, suitable to be connected to an A.C. power supply indicated by 17 and 18. The transformer has secondary terminals 21, 22, and 23, connected through wires 24 and 24' to the diodes 11 and 12. The lines 24 and 24' are connected through the diodes 11 and 12 to the line 27, thus providing a positive terminal for the rectifier circuit. The negative terminal being provided through line 26 which connects terminal 22 on the transformer circuit to the negative battery charger terminal 16. The line 24 is connected to the terminal 30 of the anode of SCR 14 and also connected at 29 to the resistor 13. The gate 31 of the SCR is connected to the end 30' of the resistor 13 and they are, in turn, connected to the positive terminal 15 of the battery charger. The transformer steps the voltage from the power supply 17 and 18 down to approximately 13½ volts A.C. which is rectified to a full wave A.C. current by the diodes 11 and 12 and may be protected by an automatic circuit breaker against overcurrent consumption. Resistor 13 may have a value of 10,000 ohms. The voltage of the charger is held constant at a value slightly above the battery voltage. As the battery charges, its voltage increases gradually, thus reducing the voltage differential between the battery and the charger. The result is a high charging rate at the outset and low charging rate near the finish. In other words, a tapering charge takes place. This is desirable since the charging rate is dependent upon the battery condition.

The SCR is gated closed by the voltage providing a voltage increase between terminals 29 and 30 through resistor 13. When the battery is drawing heavy current, the SCR is locked closed with heavy current as the battery charges, the voltage drop across the resistor becomes greater and greater until the low voltage becomes too low to gate the SCR and no current flows and the SCR circuit is open, providing a full current shutoff feature. As the battery is discharged and the voltage drops, the flow of current through resistor 13 produces a voltage drop at the gate 31 which turns on the SCR and automatically commences charging.

The resistor 13 can have a value of approximately 10,000 ohms.

Figure 2:
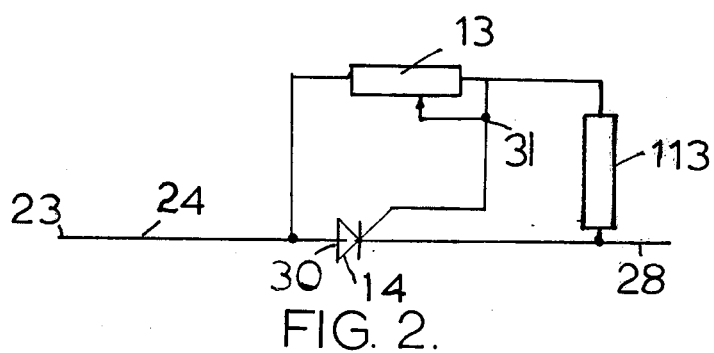
FIG. 2 is another embodiment of the invention.

In the embodiment of FIG. 2, the resistor 113 and the resistor 114 could have a value of 10,000 ohms and 1,000 ohms respectively.

Figure 3:
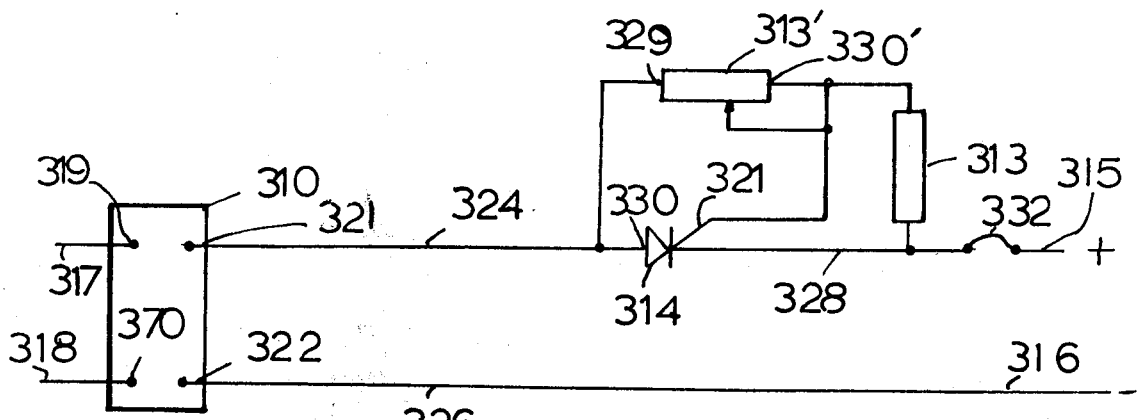
FIG. 3 is another embodiment of the invention.

In the embodiment of the invention shown in FIG. 3, an A.C. voltage from power lines 317, 318, which may be 120 volts A.C., 60-Hz is connected to terminals 319 and 320 of transformer 310 and stepped down to the proper voltage depending on the desired voltage of the battery connected to terminals 315 and 316. The secondary voltage terminals 321 and 322 are connected through lines 324 and 326. Line 326 is connected to terminal 316 which may be connected to the negative terminal of a battery. Line 324 is connected to the anode 330 of SCR 314. The anode of SCR 314 is connected to the positive terminal 315 which will be connected to the battery to be charged.

The gate 331 of the SCR 314 is connected to the line 330' which is connected to the resistor 313' and to the resistor 313. Resistor 313 is connected to line 329 and to line 330'.

The resistor 313' may be a potentiometer as shown and have a value of 12,000 ohms and be a half-watt resistor. For example, the resistor 313 may have a value of 1,000 ohms and likewise be a ½ watt resistor.

Instead of potentiometer 313' a fixed value resistor having a value of, for example, 12,000 ohms could be used.

The charging circuit shown in FIG. 3 differs from that shown in the embodiments of FIG. 1 and 2 in that it utilized a half-wave rectified circuit.

The structure shown in FIGS. 4, 5, 6, and 7 show mechanical structure for the battery charger, chassis, and a cover 51, for the chassis. The chassis contains the transformer 10 which is held in place to the bottom 42 of the chassis by means of screws received in the holes 44, in the frame 45 of the transformer. Ends 45 and 46 are integral with the bottom 42, and extend upwardly therefrom and laterally extending flanges 47 are fixed to the end 45 and extending flanges 48 are fixed to the end 46. The vertically extending flanges 49 are fixed to the bottom 42 and the ears 50 of the transformer are attached to the bottom 42 by the screws in holes 44.

The cover 51 is generally U-shaped and has a top 52 and a front 53 and rear 54. The cover is set over the top of the transformer 10 with the holes 55 receiving screws that enter the holes 56 in the flange 49 and the holes 57 receive screws that are received in holes 56 in flanges 49. The top 52 of the cover 51 rests on the bracket 58 and squeezes the bracket against the transformer. The bracket 58 is a metalic member supporting the silicon control rectifier 14 and fixed to the SCR. The surface of the transformer acts as a heat sink for carrying away the heat generated by the SCR 14. Transformer 10 has two secondary windings. Terminal 22 is made up of the ends of two secondary terminals connected together by a conductor on the backside of the printed circuit board.

The printed circuit board 60 has a hole 61 at each corner, which receives the terminal ends of the secondary windings of the transformer 10, which are wires 21, 22, and 23. The ends of the secondary windings support the printed circuit board and hold it in place.

The lines 17 and 18 extend through grommet 66, set into a hole in the wall 46, and the wires 15 and 15 are connected to a battery to be charged; extend through a rubber grommet 67, in a hole in the end 45 of the chassis.

The diode rectifiers 11 and 12, the resistor 113, the potentiometer 13, the circuit breaker 32, and the terminals 28 30 and 31 of SCR 14, are all supported on the printed circuit board. The side of the printed circuit board adjacent the coil 63 of the transformer will have the proper electrical conductors to provide a connection for the circuit that is shown in FIG. 1, 2 or 3.

The plug 70 shown in FIG. 8 is adapted to be received in the receptical 71 which has lead wires 72 and 73 adapted to be connected to a battery to be charged. The plug 70 has a central positive terminal 74 and a peripheral negative terminal 75 to engage corresponding terminals in the receptical 71.

The plug 70 has lead wires 15 and 16 which are extensions of lines 15 and 16 in FIG. 1.

The plug 70 is of a size to fit into a conventional cigarette lighter receptical in the dashboard of a vehicle; therefore, to charge a battery, it is merely necessary to insert the plug 70 into the lighter receptical of a vehicle. The terminal 75 will engage the inside ground terminal of the receptical and the central terminal 74 will engage the positive terminal of the receptical, therefore the user need never be concerned about connecting the charger to the correct terminal of the battery. The foregoing also constitutes an extermely convenient manner in which to connect a charger to a battery.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A battery charger wherein said battery charger comprises a transformer, a printed circuit board supporting the electronic components of said charger,
   said electronic components comprising a silicon control rectifier,
   said silicon control rectifier having a flat metallic support bracket,
   said support bracket resting on said transformer core and a cover for said charger resting on said support bracket holding said support bracket in heat transfer relationship with said transformer core.

2. A battery charger circuit made up of a full wave rectifier adapted to be connected to an A. C. power line,
   said rectifier having a positive terminal and a negative terminal,
   said battery charger having a positive terminal and a negative terminal,
   said negative terminal of said rectifier being connected to said negative terminal of said battery charger,
   a silicon-controlled rectifier having a cathode, an anode and a gate,
   said anode being connected to said positive terminal of said rectifier circuit,
   said cathode being connected to said positive terminal of said battery charger,
   and a first resistor connected in parallel with said cathode and said gate providing a full current shut-off when the battery is charged,
   a second resistor connected from said gate to said anode,
   said negative terminal of said battery charger being connected to said negative terminal of said power supply and being free of any electrical connection to said gate of said silicon-controlled rectifier,
   said gate connected to the common connection between said first resistor and said second resistor,
   a printed circuit board,
   said silicon-controlled rectifier, said resistor, said diodes and said potentiometer being supported on said printed circuit board; and said anode, cathode and gate of said silicon-controlled rectifier each having a terminal member fixed to said printed circuit board,
   said circuit further comprises a transformer having a winding,
   a support comprising four spaced terminals supported on said winding of said transformer,
   said terminals being fixed to said printed circuit board at spaced positions thereon, forming a support for said printed circuit board.

3. The battery charger recited in claim 2 wherein said A. C. circuit further comprises a transformer, a circuit breaker a first diode and a second diode connected to said transformer,
   said transformer has a winding, a printed circuit board supported on said winding terminals,
   said circuit breaker, said resistor, said potentiometer, and said silicon controlled rectifier being supported on said printed circuit board.

4. A battery charger circuit made up of a full wave rectifier adapted to be connected to an A.C. power line, said rectifier having a positive terminal and a negative terminal,
said battery charger having a positive terminal and a negative terminal,
said negative terminal of said rectifier being connected to said negative terminal of said battery charger,
a silicon controlled rectifier having a cathode, an anode and a gate,
said anode being connected to said positive terminal of said rectifier circuit,
said cathode being connected to said positive terminal of said battery charger,
and a first resistor connected in parallel with said cathode and said gate providing a full current shut-off when the battery is charged,
a second resistor connected from said gate to said anode,
said negative terminal of said battery charger being connected to said negative terminal of said power supply and being free of any electrical connection of said gate of said silicon-controlled rectifier,
said gate connected to the common connection between said first resistor and said second resistor,
said circuit further includes a transformer having a winding and a core,
said frame having an outer surface,
said silicon-controlled rectifier having a flat, plate-like bracket fixed thereto in heat transfer relation thereto,
a cover for said charger,
said cover resting on said bracket, clamping said plate-like bracket in contact with said core in heat transfer relation thereto, thereby providing a heat sink for said silicon-controlled rectifier.

* * * * *